UNITED STATES PATENT OFFICE.

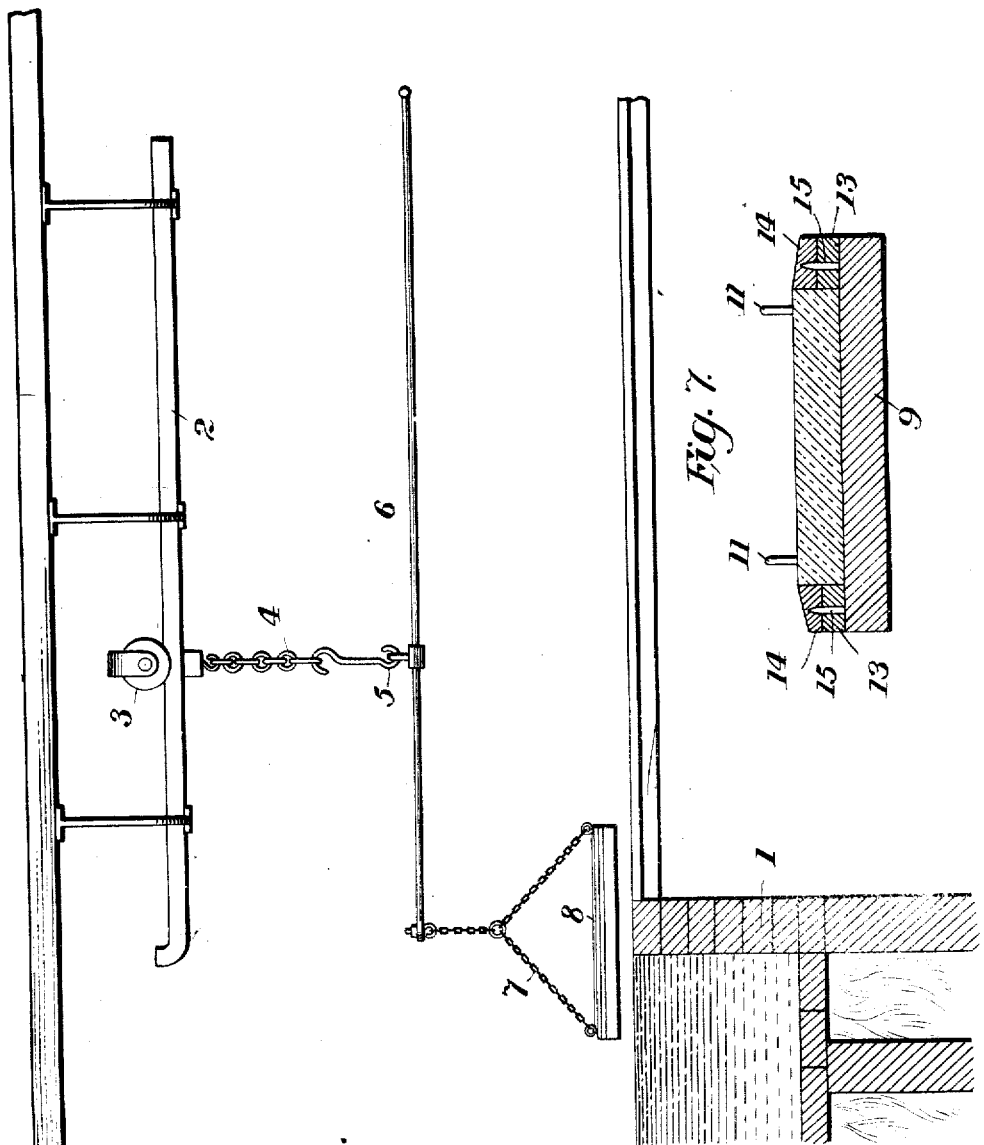

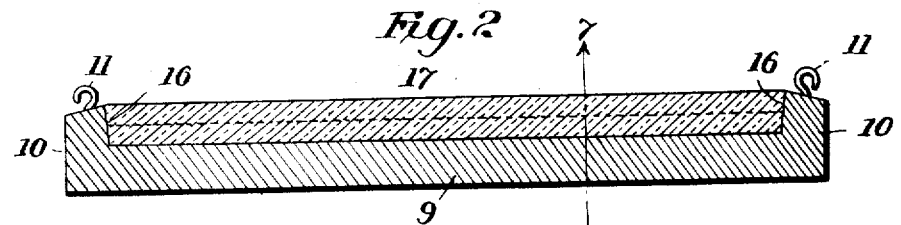
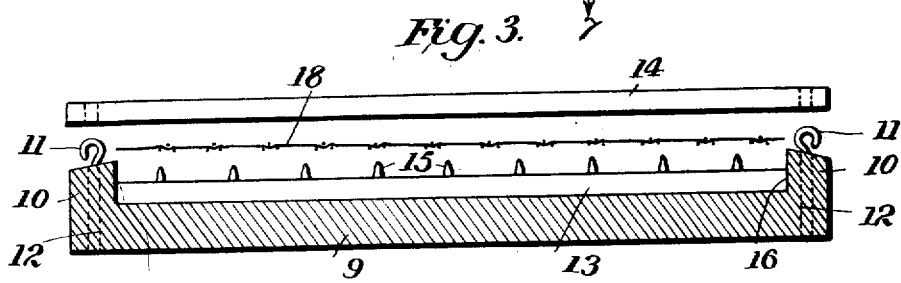
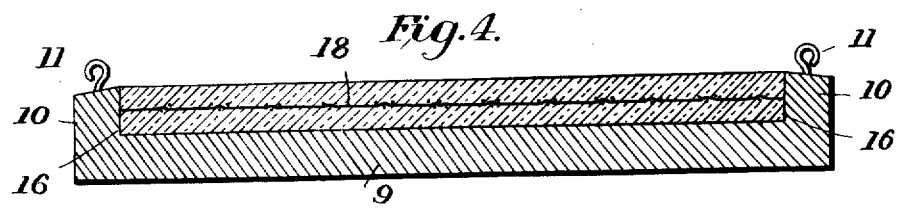
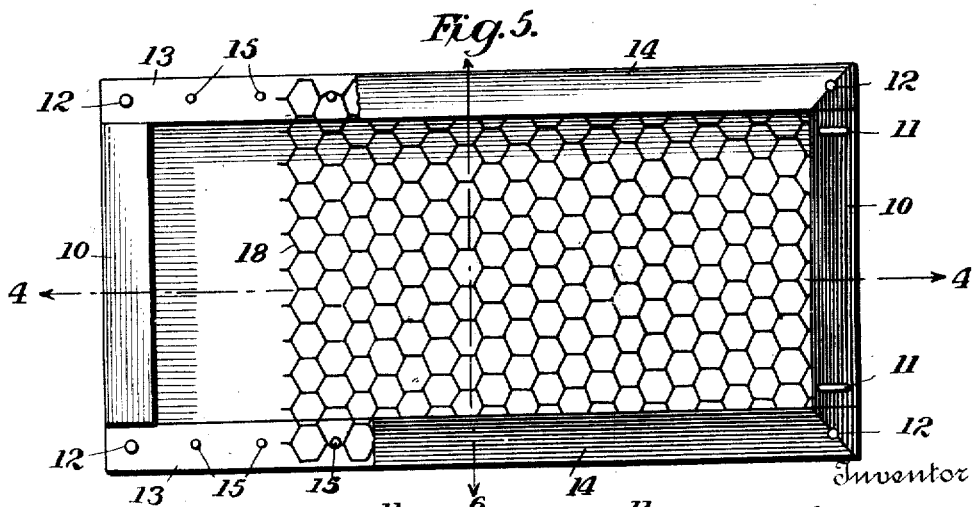
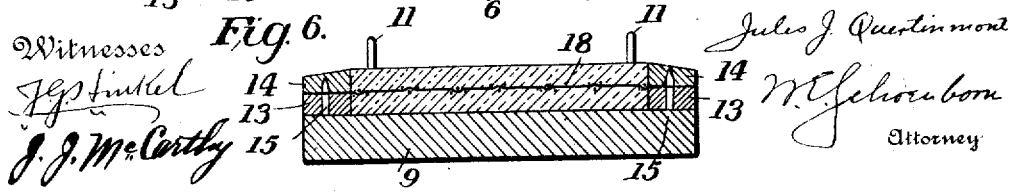

JULES J. QUERTINMONT, OF POINT MARION, PENNSYLVANIA.

PROCESS AND APPARATUS FOR MAKING PLATE, WINDOW, OR WIRE GLASS.

No. 911,678.  Specification of Letters Patent.  Patented Feb. 9, 1909.

Application filed September 24, 1907. Serial No. 394,318.

*To all whom it may concern:*

Be it known that I, JULES J. QUERTINMONT, a citizen of the United States, residing at Point Marion, in the county of Fayette and State of Pennsylvania, have invented certain new and useful Improvements in Processes and Apparatus for Making Plate, Window, or Wire Glass, of which the following is a specification.
My invention relates to the manufacture of glass, and is applicable to the production of plate, window or sheet glass of all varieties whether wired or not.

The present matter has to do only with the broad general principle upon which my invention is based, namely, in making plate, window or sheet glass of all varieties in which one side is already finished or polished and not required to be further acted upon by a tool and finished by any polishing action.

The said invention is herein enbodied in suitable mechanism for carrying the same into practice, the mechanism here illustrated and described being merely one of many forms that may be adopted.

In the following description and in the annexed drawings I shall avoid, as far as practicable, all unnecessary details in order to preclude uncertainty or mistake as to the leading and important features or elements of the invention and of the machinery for carrying out that invention, or in other words; I shall describe and illustrate a very simple embodiment of the invention which practical tests have demonstrated to be satisfactory and efficient.

Briefly stated, the invention consists in the manufacture of plates, sheets, or films of glass of any desired form having one side or surface highly polished without the necessity of having any polishing tools applied thereto.

Referring now to the annexed two sheets of drawings: Figure 1 is a side elevation partly in section of a glass melting furnace with means for handling the molding frames while dipped into the molten glass; Fig. 2 is a longitudinal section of the dipping frame with an ordinary glass plate formed therein:
Fig. 3 is a longitudinal section of the dipping frame for making wire glass with the different parts separated; Fig. 4 is a longitudinal section on line 4—4 of Fig. 5 with the parts assembled and the glass plate formed therein; Fig. 5 is a plan view of Fig. 4 partly broken away and the glass removed; Fig. 6 is a transverse section on line 6—6 of Fig. 5 with glass plate formed therein; Fig. 7 is a transverse section on line 7—7 of Fig. 2.

Similar reference characters indicate the same parts in the several figures of the drawings.

Referring to Fig. 1 of the drawing, 1 represents a sectional view of an ordinary glass melting furnace while 2 is any well known form of overhead supporting track. 3 is a trolley wheel moving back and forward on track 2, said wheel carrying a depending and flexible supporting means 4 from which is hung by pivotal joint 5 a horizontal operating rod 6. Attached to one end of said rod 6 by means of flexible chains or cables 7, as indicated, is a dipping frame or mold 8 which may be of any shape or form either in depth or contour so as to be of the exact shape which it is desired the finished product should assume. Said flexible chains or cables 7 are arranged and fastened to the dipping frame so that the frame will be held in a horizontal position as indicated for the reasons that will be hereinafter explained.

The preferred form of frame or mold for making the plate of glass is shown in Figs. 2-7 and consists of a bottom 9 having preferably integral or fixed end sections 10, 10, to which are attached the eyes 11 or other means for connecting the supporting chains or cables as shown in Fig. 1. Attached to the bottom 9 and on each side by means of corner pins 12, see Fig. 5, are upper and lower side pieces 13 and 14, see Figs. 3, 5, 6 and 7, thereby forming a shallow dipping frame or tray. Attached to and passing through the lower side pieces are pins 15 which fit into corresponding recesses in the under side of the upper pieces 14, as shown in Figs. 6 and 7, and whose function will be hereinafter explained.

The inner side walls 16 of the frame, see Figs. 2 and 4, may be slightly inclined as shown in Fig. 2, for easily removing the plate of glass after being formed or they may be vertical as shown in Figs. 3 and 4. The upper surfaces of the end and side pieces 10 and 14 are beveled from the top of the inner walls of frame and incline towards the outside of the frame so that after the molten glass is dipped or poured in by a ladle the superfluous molten glass will freely and uniformly flow off from the body of glass in the mold without straining or pulling the same.

The mode of carrying out the process and applying the apparatus is as follows: When it is desired to make plain plate or window glass a frame of the proper dimensions and assembled as shown in Figs. 2 and 7 is properly poised on a traveling rod supported as indicated in Fig. 1. As soon as the perfectly clean frame 8 is in the furnace and over the melted glass it is gradually dipped into the glass when the same will flow slowly over all the sides and entirely displace all the air and fill every portion of the depressed section of the frame. After the same has been filled with molten glass it is slowly raised therefrom and permitted to pause in its movement out of the furnace a short time over the melted glass and permit all the superfluous glass, owing to the beveled or outwardly inclined top edges of the sides of the frame, to readily flow away from the glass held in the depressed section of the frame. The frame is then slowly and easily withdrawn from the furnace by means of rod 6 and overhanging trolley support 2, and the glass permitted to cool. It has been found that the upper surface of the glass when permitted to be formed with the conditions as indicated above, is perfectly smooth and even and with such a luster that no further polishing or other operation is required to finish this side of the plate. The plate of glass 17 may be removed by either turning over the frame or removing one side of pieces 13 and 14 and sliding the cooled plate from the frame. After this the lower or bottom side of the plate of glass may be finished or polished up when the glass is ready for the market.

While I have described that the frame 8 may be dipped into the molten glass for the purpose of filling the same I wish it to be distinctly understood that after the frame has been inserted into the furnace and over the molten glass I may provide a ladle for taking the molten glass and pouring into the frame and thereafter repeat the operation as already described.

In making wire glass one separates the frame as indicated in Fig. 3 by removing the upper pieces 14 on each side, then stretch a proper size or section of wire mesh 18 which meshes from one set of pins 15 on one side piece 13 to the other side as indicated in Figs. 5 and 6. The top side pieces are then replaced as indicated and the frame is dipped or filled with molten glass and after cooling can be made to go through the same operations as already described in connection with Figs. 2 and 7.

From the foregoing description of the method and apparatus it will be readily seen that I have invented a process and means for carrying out the same wherein plate, window or sheet glass can be easily and cheaply manufactured and in which one side of the plate has been produced with its natural finish or luster without having been touched by any tool or molding surface.

Various changes may be made in the specific construction of the frame or molds and means for carrying it in and out of the furnace or in filling the frame or mold with molten glass, and while I have shown my preferred form of frame and apparatus for carrying out my process I do not care to limit myself to these specific arrangements, as they could be modified in many ways without departing from the spirit of my invention and accomplish the same results.

What I claim as new and desire to secure by Letters Patent is as follows:—

1. The method of making plate, window or sheet glass which comprises the introduction of molten glass to freely overflow the upper inner edge of the mold until its upper surface corresponds to the plane of the top edge of the frame or mold and carefully drain off the superfluous molten glass and then cool said body of glass in said frame or mold.

2. The method of making plate, window or sheet glass which comprises the introduction of molten glass in a shallow frame or mold and permitting the upper surface of the glass to freely and uniformly overflow the upper inner edge of the mold until its upper surface corresponds to the plane of the top edges of the frame or mold and completely drain off the superfluous molten glass then cooling said body of glass in said frame or mold and finally polishing the lower surface of the glass which is contiguous to the bottom of the frame or mold.

3. The method of making plate, window or sheet wire glass which comprises the supporting of wire netting between the bottom and top planes of a shallow mold or frame, introducing molten glass into the said frame or mold and permitting the upper surface of the molten glass to freely and uniformly overflow the upper inner edge of the frame until its upper surface corresponds to the plane of the top edges of the frame and completely drain off the superfluous molten glass and then cool said body of glass in said frame or mold.

4. The method of making plate, window or sheet wire glass which comprises the supporting of wire netting between the bottom and top planes of a shallow mold or frame, introducing molten glass into the said frame or mold and permitting the upper surface of the molten glass to freely and uniformly overflow the upper inner edge of the frame until its upper surface corresponds to the plane of the top edges of the frame and completely drain off the superfluous molten glass and then cool said body of glass in said frame or mold, and finally polishing the lower surface of the glass which was contiguous to the bottom of the frame or mold.

5. An apparatus for making plate, window or sheet glass comprising a base section, side and end pieces attached to the base and forming therewith a shallow depression, the upper portions of the side and end pieces being inclined downwardly from their innermost to their outer edges.

6. An apparatus for making plate, window or sheet glass comprising a base section having attached thereto end pieces and a side piece, a removable side piece; said side and end pieces forming with the base a shallow depression, the upper portions of the side and end pieces being inclined downwardly from their innermost to their outer edges.

7. An apparatus for making plate, window or sheet glass comprising a rectangular base section having secured to its corners upright pins, end pieces attached to the base, side pieces removably secured to the base by said pins, said side and end pieces forming with the base a shallow depression, the upper portions of the side and end pieces being inclined downwardly from their innermost to their outer edges.

8. An apparatus for making plate, window or sheet glass comprising a rectangular base section having permanently secured thereto end pieces and primary side pieces, pins projecting from the upper face of the primary side pieces and adapted to engage and support a wire mesh, and secondary side pieces superposed upon said primary side pieces and having recesses for engaging the pins on said primary side pieces.

9. An apparatus for making plate, window or sheet glass comprising a rectangular base section having permanently secured thereto end pieces and primary side pieces, pins projecting from the upper face of the primary side pieces and adapted to engage and support a wire mesh and secondary side pieces superposed upon said primary side pieces and having recesses for engaging the pins on said primary side pieces, said side and end pieces forming with the base a shallow depression the upper portions of the side and end pieces being inclined downwardly from their innermost to their outer edges.

In testimony whereof I affix my signature in presence of two witnesses.

JULES J. QUERTINMONT.

Witnesses:
W. T. DEVLIN,
FLORISE DULIERE.